United States Patent

Esterly et al.

[15] 3,652,808

[45] Mar. 28, 1972

[54] APPARATUS AND METHOD FOR REVERSE RECORDING A MASTER TAPE FOR CONTACT DUPLICATION OF MAGNETIC TAPES

[72] Inventors: Daniel David Esterly, Fremont; Larry Michael Jacob, Redwood City, both of Calif.

[73] Assignee: Ampex Corporation, Redwood City, Calif.

[22] Filed: Nov. 20, 1969

[21] Appl. No.: 878,512

[52] U.S. Cl. ................179/100.2 E, 178/6.6 A, 179/100.2 T
[51] Int. Cl. ....................................G11b 5/86, G11b 15/44
[58] Field of Search ...........179/100.2 E, 100.2 MI, 100.2 T; 178/6.6 A; 335/284; 346/74 M

[56] References Cited

UNITED STATES PATENTS

| | | | |
|---|---|---|---|
| 3,229,035 | 1/1966 | Bounsall | 178/6.6 A |
| 3,534,182 | 10/1970 | Prochnow | 346/74 M |
| 3,541,577 | 11/1970 | Lemke | 179/100.2 E |

*Primary Examiner*—Stanley M. Urynowicz, Jr.
*Assistant Examiner*—Alfred H. Eddleman
*Attorney*—Robert G. Clay

[57] ABSTRACT

In a wideband, transverse scan magnetic tape recording system, such as used for video signals, a standard transport is modified for recording high resolution and magnetically durable master tapes to be used in making multiple copies thereof by a contact duplicating process in which a blank tape is brought into face-to-face contact with the master tape. In particular, the transport for recording the master tape is arranged to record the transverse magnetic tracks in a pattern having a reflected or mirror image relationship with the tracking format carried by tapes adapted for playback on a standard transverse scan transport. The contact duplicate of the master thus receives the proper magnetic image for playback on standard machines. The modifications which are made to the standard recording mechanism are such that a single transport unit may be employed for recording of the master tape, playback of the contact duplicate tapes made therefrom, or recording and playback of other standard tapes, by interchanging a few component parts and making certain minor adjustments to the standard unit depending on the desired use.

13 Claims, 7 Drawing Figures

INVENTORS
DANIEL D. ESTERLY,
LARRY M. JACOB

BY Robert G. Clay

ATTORNEY

INVENTORS
DANIEL D. ESTERLY,
LARRY M. JACOB
BY Robert G. Clay
ATTORNEY

APPARATUS AND METHOD FOR REVERSE RECORDING A MASTER TAPE FOR CONTACT DUPLICATION OF MAGNETIC TAPES

The present invention generally relates to tape recording systems and more particularly to a method and apparatus for making a master magnetic tape for use in a duplicating process in which the stored magnetic information on the master tape is transferred to a blank tape by bringing such tapes into face-to-face contact.

The need exists for more efficient methods for making copies of prerecorded magnetic tapes. Typically, copies are made by playing a master tape on a master control transport and simultaneously recording a plurality of blank tapes on a corresponding number of slave transports responsive to the master unit. As the demand for prerecorded entertainment in the form of magnetic tape increases, the inefficiency of this duplicating process has become a more pronounced drawback to the industry and efforts have turned toward improved copying techniques. One such technique, analogous to the duplication of phonograph records, provides for forming a durable magnetic image on a master magnetic tape and thereupon successively transferring the magnetic image carried by the master onto a plurality of blank magnetic tapes by a process known as contact duplication. Essentially, the master tape and blank copy are brought into face-to-face engagement and a magnetic field of selected characteristics is applied to the engaged tapes so as to cause a transfer of the magnetic image to the blank tape. This process has been achieved by bifilar winding of the master and blank tapes and thereafter applying the magnetic field, or by driving the master and blank tapes in unison and at high speeds and applying the magnetic field at a location where the two tapes merge, momentarily into face-to-face engagement. Exemplary contact duplicating schemes are illustrated by U.S. Pat. No. 2,378,383; U.S. Pat. No. 2,890,288; and U.S. Pat. No. 2,918,537.

Contact duplicating processes thus far employed have been intended for making copies of taped audio and other low frequency information where the magnetic image is recorded along longitudinal tracks parallel to the tape axis. In such cases, the master tape need only carry magnetically stored information in one dimension, which when transferred to the blank copy reappears in the same one-dimensional track pattern ready for playback on a standard transport. In other words, no special considerations are required in regard to the relationship between the magnetic image carried by the master tape and the resulting image received by the contact duplicate thereof. However, when contact duplication is applied to standard wideband recording processes such as used for video signals, the recording of the master tape on a standard transport results in obtaining a contact duplicate tape having a magnetic pattern entirely incompatible for playback on standard equipment. This incompatibility stems from the two-dimensional nature of the stored magnetic image on a tape recorded by conventional video recording equipment. The contact duplicate made from the master video recording thus receives an inverted or more precisely mirror image pattern of the magnetic format originally recorded on the master tape. The standard playback transport is incapable of reading this inverted image.

Video or other wideband signals are most commonly recorded on magnetic tape by rotating the magnetic record/playback heads at high speeds, in a path generally transverse to the longitudinal tape axis. The rotation of the magnetic heads in conjunction with a simultaneously applied, longitudinal advancement of the tape causes the magnetic tracks to be recorded slightly askew from the normal. Furthermore, this angulation of the otherwise transverse tracks occurs in a given sense with respect to the direction of longitudinal tape advancement. When this two-dimensional magnetic information is transferred to the contact duplicate tape, the magnetic tracks are angulated in an opposite sense with respect to the transverse tracks of the master tape. Accordingly, any attempt to play back the duplicated tape on the same transport will result in total failure of the playback signal.

While it is apparent that contact duplicates of video recordings cannot be made by the same straight forward processes suitable for producing duplicate audio tapes, one possible solution to the image inversion problem is to first record a video tape on a standard transport and thereupon make a contact duplicate of the original recording, using such duplicate as the master tape for future generation copies. The shortcoming of this scheme lies principally in the difficulty of obtaining a high resolution, magnetically stable and mechanically durable duplicate tape for use as a master, particularly when extremely high resolution duplicates are required as in the case of video color recordings.

Accordingly it would be desirable, and thus it is an object of the present invention, to provide a method and apparatus for producing a wideband magnetic tape recording suitable for generating one or more magnetic recording copies therefrom by a contact duplication process.

While it is recognized, that the present demand for prerecorded video tape entertainment is not at the same high level as is the demand for prerecorded audio tapes, there are certain differences in the audio and video recording processes which make the present invention of significant value, notwithstanding. The duplication of audio tapes can be achieved at very high speeds of longitudinal tape translation even when the older tape duplicating process, as described above, is employed. However, video tapes can be recorded on a slave transport only at the same relatively slow, normal record/playback tape translation rate. Furthermore, the cost of each slave transport for duplicating video tapes is at present prohibitively high.

It is another object of the present invention to provide a method and apparatus as above, wherein a standard transverse scan video tape transport can be adapted with a relatively few number of modifications, for recording the proper image on the master tape for making a contact duplicate having a standard magnetic track format.

A further object of the present invention is to provide a method and apparatus as above, wherein a standard transverse scan video transport may be readily converted back and forth between a modified form capable of recording the proper magnetic image on a master tape for making contact duplicates thereof, and a transport having standard operating features for recording and playing back standard videotapes.

These and other objects of the present invention are achieved by making certain fundamental, yet easily executed changes in the operating characteristics of a standard transverse scan wideband tape transport so as to record a master tape having the magnetically stored information arranged as if it were the mirror image of the standard magnetic tape recording. Particularly, a conventional transverse scan tape transport is equipped with a rotary head wheel carrying a plurality of four magnetic record/reproduce heads rotating in a path precisely normal to the longitudinal tape axis. The magnetic tape is longitudinally advanced simultaneously with the rotation of the head wheel. If on a standard transport, the head wheel rotates in a first sense or direction with respect to the direction in which the magnetic tape is longitudinally advanced, then the present invention provides for rotating such head wheel in a second or opposite sense with respect to the direction tape advancement. As more fully explained herein, in order to insure that the transverse magnetic tracks will be properly positioned with respect to the width of the tape, the present invention also provides for inverting the tape guide which maintains the tape in proper spatial relation with respect to the rotating head. By virtue of these modifications to the transport, transverse magnetic tracks are layed down as the reflected or mirror image of magnetic tracks on a standard tape recording.

Furthermore, most wideband tapes, particularly video tapes, are provided with a set of low frequency longitudinally recorded tracks running adjacent each edge of the tape. A tape recording in which only the direction of head wheel rotation was changed would result in a tape having the transverse video tracks appear in mirror image form while having the longitudinal low frequency tracks appear as though on a standard tape. Accordingly, the present invention provides, in addition to the above transport changes, for repositioning each of the stationary low frequency record heads, particularly the low frequency control track head, audio record head, and cue track record head in the case of a video transport.

The rotating direction of the head wheel and the location of the various stationary record/reproduce heads have been standardized throughout the video recording industry, such that most if not all transports are only adapted for recording and playing back tapes having the standard track format. Accordingly, one of the features of the present invention is that a basic transverse scan wideband tape transport can be readily converted between the standard machine and a unit having the appropriately modified operating features for recording a reflected image master tape for use in contact duplication. This allows for efficient utilization of a single record/reproduce unit. The unit both in its standard form and modified version employs substantially the same control and signal electronics.

A better understanding of the invention may be had by reference to the following description, to be taken in conjunction with the accompanying drawings, in which.

Figure 5:
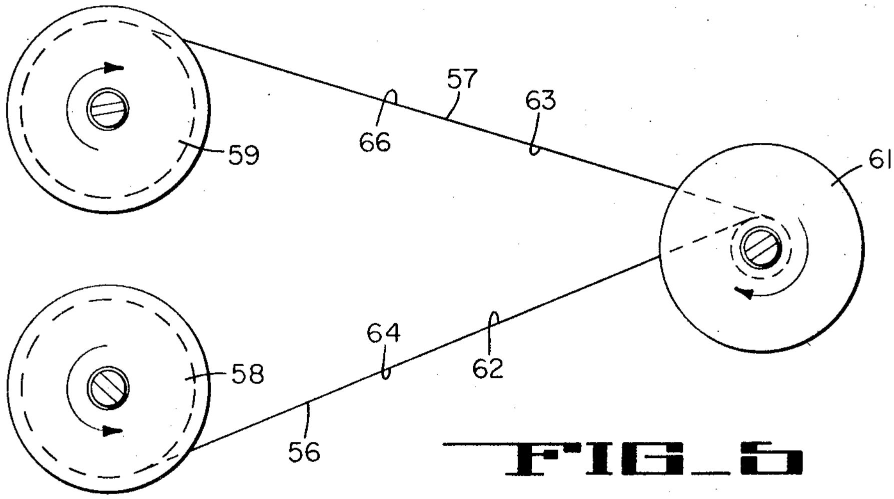
Figure 6:
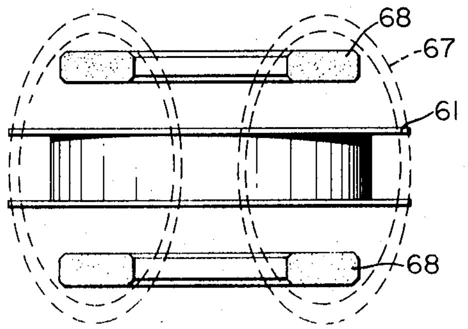
Figure 7:
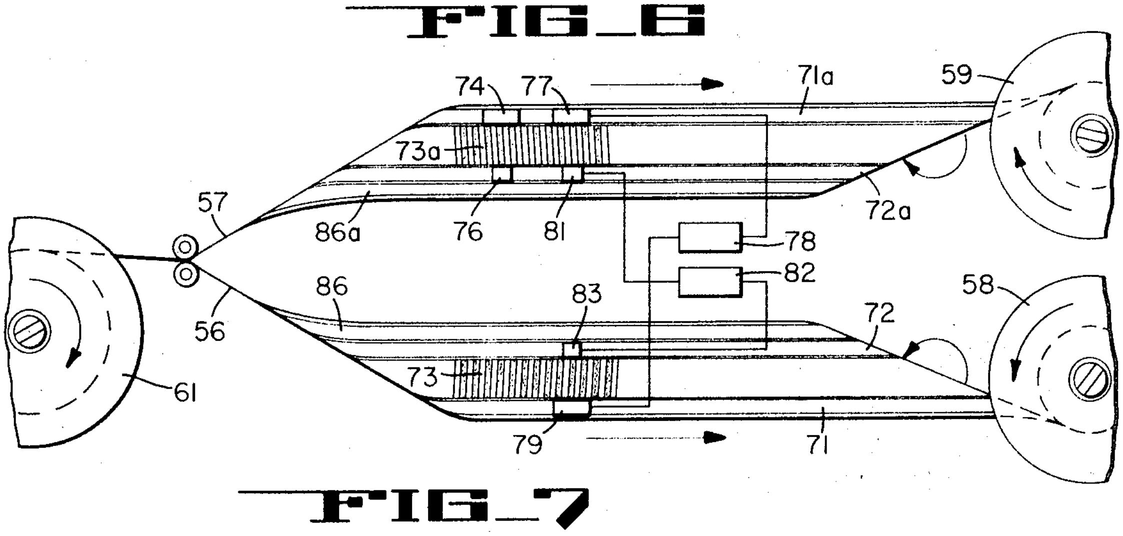

FIG. 5 diagramatically illustrates winding of two tapes, the master and blank copy, onto a single reel to obtain a bifilar wind therebetween as one step in contact duplication process;

FIG. 6 diagramatically illustrates the step of transferring the magnetic image from the master tape to the blank copy by applying a preselected magnetic field to the bifilar wound tapes; and FIG. 7 is another diagramatic illustration depicting the manner by which the master tape and duplicate copy thereof are separated in a final stage of the duplication process.

Figures 1, 2:
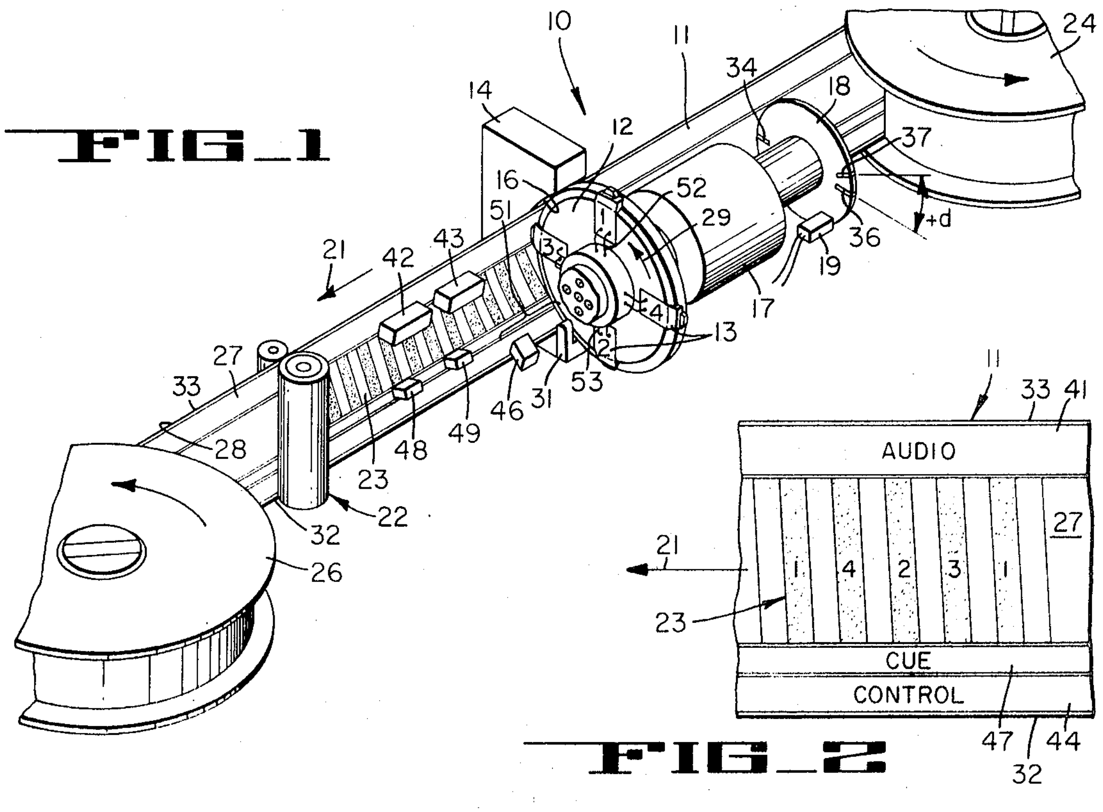
FIG. 1 is a perspective view of the component layout for a standard transverse scan wideband tape transport mechanism.
FIG. 2 is a plan view of a section of magnetic tape recorded on the mechanism of FIG. 1, illustrating the format of the various magnetic tracks.

In order to facilitate understanding of the present invention reference is first made to FIG. 1, where a standard transverse scan transport mechanism 10 is shown, for recording (or reproducing) wideband signals on a magnetic tape 11. The present day usage of such a transport is primarily for recording and reproducing video signals, however, the unit is equally capable of processing other information signals found in digital and analog instrumentation systems. Particularly, a standard transport 10 is comprised of a rotary head wheel 12 carrying a plurality of four magnetic record/reproduce heads 13 in quadrature. A vacuum guide 14 having a semi-circular cut-out portion 16 shaped to conform to the outer radial edge of wheel 12 provides for forming tape 11 into a curved web matching the arcuate path of heads 13. Wheel 12 is rotated by a motor 17 and the rotational speed and angular displacement thereof is monitored by a tachometer disc 18 and a cooperating pickup 19. Thus, as tape 11 is longitudinally advanced in a direction 21 by a capstan drive 22, magnetic heads 13 sequentially record a series of transverse magnetic tracks 23 encoding the wideband signal information as a function of time measured along the length of such tracks. While the axis of wheel 12 is parallel to tape 11 such that heads 13 are rotated in a path precisely normal to the longitudinal tape axis, the simultaneous longitudinal movement of the tape and rotation of wheel 12 cause magnetic tracks 23 to be set slightly askew from the normal as best shown by FIG. 2.

Tape 11 is fed from a storage reel 24 and rewound on a take-up reel 26 as shown by FIG. 1. A magnetic surface 27 of the tape is coated with an emulsion or the like of finely divided magnetizable particles, typically of iron oxide. In order to give strength and durability to tape 11, magnetic surface 27 is carried on a web of plastic base material, such as polyester film, defining a back surface 28. As wideband signal information can be successfully recorded only on the magnetic surface side of tape 11, it will be appreciated that the rotational direction or sense of wheel 12 with respect to the direction 21 of tape advancement during recording, determines the slant orientation of the resulting transverse magnetic tracks 23.

Figures 3, 4:
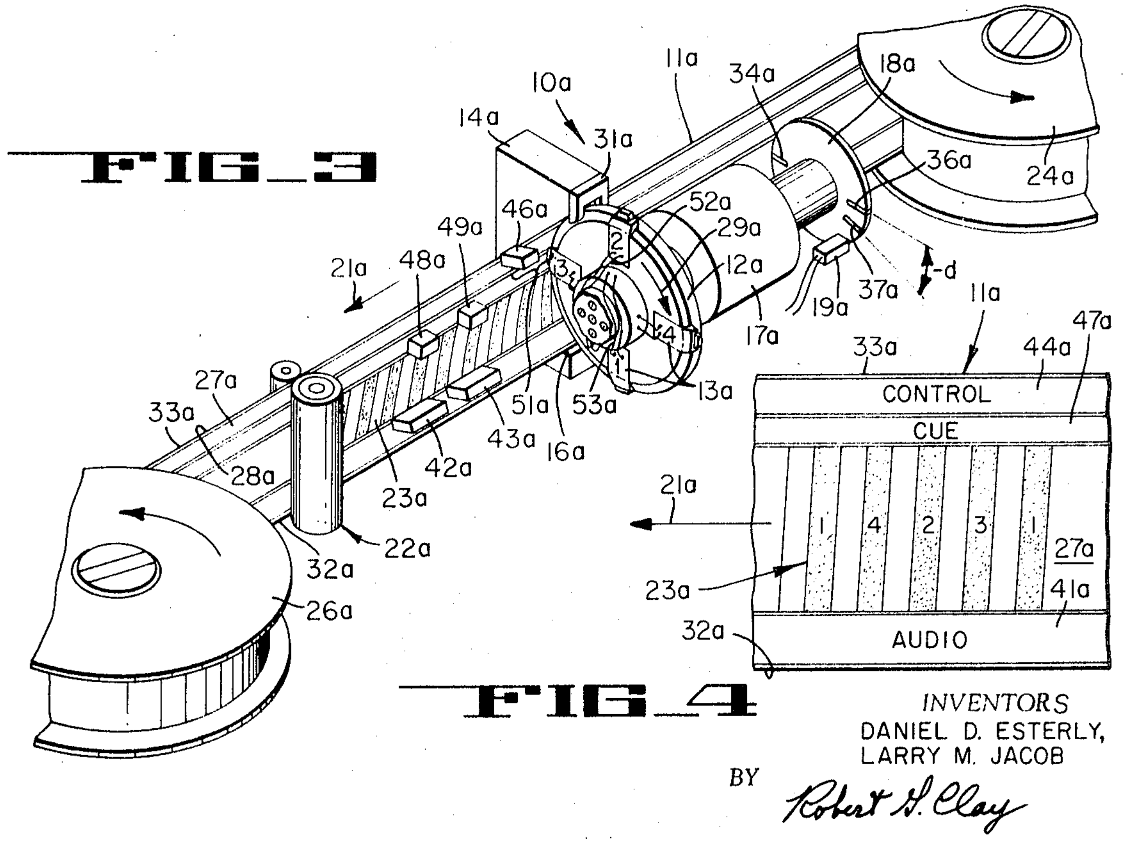
FIG. 3 is a perspective view illustrating a transport mechanism as shown by FIG. 1, modified for recording a master tape in accordance with the present invention.
FIG. 4 is a plan view illustrating a segment of magnetic tape recorded on the mechanism shown by FIG. 3, depicting the format of the various magnetic tracks.

The present invention provides for modifying the transport 10, shown in FIG. 1, to provide a transport **10*a* shown in FIG. 3 capable of recording a master tape 11*a* shown by FIG. 4 having transverse tracks 23*a* disposed as a mirror image of tracks 23 on tape 11. As disclosed more fully herein, tape 11*a* carries a master recording to be used in a contact duplication process for making multiple copies therefrom. To facilitate a comparison between FIGS. 1 and 3 and FIGS. 2 and 4**, corresponding parts are identified with common reference numerals followed by the postscript "*a*" for the parts shown in FIGS. 3 and 4. Using the rotational direction of head wheel 12 on the standard transport of FIG. 1 as a reference, the rotating direction of head wheel **12*a* for the modified transport shown by FIG. 3 is reversed. Thus, if head 12 in FIG. 1 rotates in a direction 29, as has been sanctioned by industrial and broadcasting standards, then head wheel 12*a* of modified transport 10*a* will be rotated in the opposite direction 29*a*. The rotational sense in both cases is determined with respect to the direction of tape advancement, 21 and 21*a*. Here the directions of tape advancement 21 and 21*a* are the same and accordingly, the rotational direction of head wheels 12 and 12*a* appear opposite in the drawings. This same relationship can be achieved by reversing the direction 21*a* of the longitudinal tape advancement and maintaining the same rotating direction for head wheel 12*a* and head wheel 12**. However, changing to direction of longitudinal tape advancement would require extensive rearrangement of the transport mechanism. It is preferred to retain the basic parts layout as shown for the standard mechanism in FIG. 1, and make alterations thereto to arrive at the mechanism shown by FIG. 3 for effecting the object of the present invention.

By virtue of the reversed rotation of head wheel **12*a*, some transports may require rearrangement of tachometer wheel 18. In this instance, wheel 18 in addition to providing information as to the speed of head wheel 12, also identifies the angular position of each of heads 13. The 180° opposed ferromagnetic strips 34 and 36 cofunction with pickup 19 to locate head wheel 12 at either of two angular locations, 180° apart, while a third ferromagnetic strip 37 disposed at a positive angle, $+d$, with respect to strip 36 provides additional information whereby processing electronics responsive to pickup 19 can locate the angular displacement of the head wheel at one of the two possible 180° apart positions. As tachometer disc 18*a* is rotated in an opposite direction with respect to disc 18, disc 18*a* for modified transport 10*a* has been turned over to provide the proper phase relationship between ferromagnetic strips 36 and 37 as they are rotated past pickup 19*a***.

In order to properly position transverse magnetic tracks **23*a* on master tape 11*a*, vacuum guide 14*a* is in essence turned upside-down in order to relocate a tape edge guide 31, guiding a lower edge 32 of tape 11. Guide 31 is thus moved to a position as shown for guide 31*a* in FIG. 3, for locating an upper edge 33*a* of tape 11*a*. As in the case of standard transport 10, where the rotation of head wheel 12 is such as to force lower edge 32 of tape 11 into constant engagement with an interior shoulder of guide 31, head wheel 12*a* of the modified transport 10*a* rotates in an opposite sense so as to force upper edge 33*a* into sliding engagement with guide 31*a***.

In addition to the transverse magnetic tracks 23 recorded on tape 11 as shown in FIG. 2, the standard tape also carries several lower frequency magnetic tracks recorded longitudinally along opposite edges thereof. Thus, the standard video tape has a longitudinal audio track 41, recorded and erased respectively by stationary audio record and erase heads 42 and 43. As shown by FIG. 1, heads 42 and 43 are disposed adjacent an upper edge 33 of tape 11 on standard transport mechanism 10. Adjacent a lower edge 32 of tape 11, a longitudinal control track 44 is disposed which carries a signal recorded along with transverse tracks 23 for synchronizing rotation of head wheel 12 and longitudinal tape translation during playback. A single magnetic head 46 is disposed, with precision, adjacent vacuum guide 14 and lower edge 32 of tape 11 for both recording and reproducing the control track signal. Finally, a cue track 47 is arranged along side and inward of control track 44 from lower edge 32 of the tape. Standard transport 10 thus carries cue erase and cue record heads 48 and 49 respectively, located as shown by FIG. 1, spaced inwardly of lower tape edge 32.

In accordance with the present invention, the transport is rearranged in the following additional respects to obtain a reflected or mirror image disposition of the various longitudinal tracks as shown in FIG. 4 for corresponding audio, control and cue tracks **41*a*, 44*a*, and 47*a* of master tape 11*a*. On transport 10*a*, control track record/reproduce head 46*a* is moved from its position adjacent lower edge 32 of tape 11 to a corresponding location adjacent upper edge 33*a* of tape 11*a*. The spatial relation of control track heads 46 and 46*a* with respect to head wheels 12 and 12*a* must be held to exceedingly fine tolerances. For this reason, the orientation of head 46 with respect to vacuum guide 14, edge guide 31 and wheel 12 of transport 10 should be closely matched by the corresponding position of head 46*a* in relation to vacuum guide 14*a*, edge guide 31*a* and head wheel 12*a***.

A corresponding position inversion is required for audio heads 42, 43 and **42*a*, 43*a* respectively and for cue heads 48, 49 and 48*a*, 49*a*. That is, audio heads 42*a* and 43*a* are positioned adjacent lower edge 32*a* for master tape 11*a* and cue heads 48*a* and 49*a* are disposed inwardly of control track 44*a* adjacent upper tape edge 33*a*. The relocation of the various audio and cue heads does not require the same precision as does control track head 46*a*, thus, this modification can be performed by merely turning the audio-cue erase heads stack and audio-cue record/reproduce heads stack upside-down. With these various alterations made as shown by FIGS. 1 and 3, a high resolution master magnetic recording on tape 11*a* can be recorded in which the various tracks 23*a*, 41*a*, 44*a* and 47*a* appear as a reflected or mirror image of the corresponding magnetic tracks on standard tape 11. By an appropriate selection of magnetic tape 11*a*, a master recording made thereon may be transferred to a plurality of copy or slave tapes by a contact duplication process. One such process is described herein in connection with FIGS. 5, 6 and 7**.

One of the primary advantages of the present invention is that a single basic transport unit can be readily converted between a standard configuration as shown in FIG. 1 and a modified form shown in FIG. 3, the latter being capable of recording master tapes for contact duplication. Thus, a user of the present invention need only acquire a single transport unit which may be maintained in its standard form for recording and playing back standard tapes and converted to a modified form for recording master tapes for use in a contact duplication process as desired. To facilitate this conversion, it is preferable to make a substitute part for the vacuum guide in the form of an upside-down or inverted replica of vacuum guide 14 such that the standard guide may be removed and replaced with the inverted guide (guide **14*a* in FIG. 3). Similarly, an upside-down or inverted version of the mounting assembly (not shown) is made for control track head 46 for mounting the corresponding head 46*a* at precisely the same spacing from head wheel 12*a* as existed between head 46 and head wheel 12. The remaining changes merely consist in turning the audio and cue head stacks upside-down and turning tachometer disc 18** over as described above.

In many cases it will be desirable, if not required, to play back a recorded master tape **11*a* in order to determine the quality or content of the recorded video signal thereon. In order to accomplish this with a standard video tape recorder modified as shown in FIG. 3, it is necessary to reorganize the sequence of playback switching of heads 13*a* carried by wheel 12*a*. Transverse scan tape record/reproduce mechanisms which utilize four magnetic heads in quadrature as illustrated here, employ sequential switching means for enabling the individual heads to produce an output signal only as each such head sweeps across the magnetic surface of the recording tape. While such switching means is not illustrated here, the principle of operation and construction of such means is well known to those skilled in the art. For the standard transport mechanism shown in FIG. 1, the switching means would provide for enabling a read output from the heads 13 in the numbered order 1, 4, 2, 3 and 1 again, as head wheel 12 rotates in a direction 29. In FIG. 2, head 1 will read the transverse magnetic track numbered 1, head 4 will read track number 4, etc. During recording, all of heads 13** are energized simultaneously with the same recording signal such that no switching is required.

In order to render transport **10*a* capable of playing back master tape 10*a*, this switching sequence must be varied. Referring to FIGS. 1 and 3, as head wheel 12*a* rotates in a direction 29*a*, here in an opposite direction from head wheel 12, it becomes necessary to reverse the leads 52 and 53 from heads numbered 1 and 2 on head wheel 12, such that on head wheel 12*a*, head 1 becomes head number 2 and vice-versa, with leads 52*a* and 53*a* reversed as shown. The proper head switching sequence is now achieved for reading each transverse magnetic track during playback of master tape 11*a* on transport mechanism 10*a*. It will be appreciated that this alteration in the switching sequence can be effected by reversing the connections from heads numbered 1 and 2 (or heads 3 and 4**) at any point up to the switching means.

With reference to FIGS. 5, 6, and 7, the various steps of one approach to contact duplication are illustrated. This particular method has been referred to as "bifilar wind" contact duplication. The master and blank copy are jointly wound onto a single reel and thereupon exposed to a magnetic field of selected characteristics to effect the transfer of the magnetic image from the master to the copy. Particularly, with reference to FIG. 5, a recorded master tape 56 and a blank magnetic tape 57 are unwound respectively, from storage reels 58 and 59 and rewound in a bifilar manner onto a single transfer reel 61. Reels 58 and 59 are arranged such that the magnetic surfaces 62 and 63 respectively of tapes 56 and 57 come into face-to-face contact while the backing material 64, 66 of each of the tapes serve as spacing layers between engaged surfaces 62 and 63 while wound on reel 61.

After completing this step, reel 61 carrying the bifilar wound tapes is exposed to a magnetic field 67 as shown by FIG. 6. Preferably, reel 61 is formed of a nonmagnetic material so as not to influence field 67. The intensity and duration of field 67, produced by field generating means 68, are selected in accordance with the magnetic properties of master tape 56 and those of the copy tape 57. In general, the master tape is selected to have a coercivity greater than that of the copy tape and the initial intensity of magnetic field 67 is selected to lie between these coercivity levels or at least at the coercivity level of the copy tape. In order to allow the magnetic particles on copy tape 57 to assume the magnetic image presented by master tape 56, it is necessary to rapidly vary the polarity of field 67 and decrease its peak intensity to zero over a period which includes at least several reversals in the polarity of the field. A frequency of 60 hertz is suitable as an excitation frequency for this purpose, while the intensity of the field is decreased over a period of several seconds. The following chart provides exemplary values for the coercivity of the master and copy tapes and the peak intensity of transfer field 67.

| Master Tape | Copy Tape | Transfer |
|---|---|---|

| Coercivity | Coercivity | Field |
|---|---|---|
| 460 Oersteds — | 280 Oersteds — | 280 Oersteds |
| 560 Oersteds — | 280 Oersteds — | 300 Oersteds |
| 655 Oersteds — | 280 Oersteds — | 300 Oersteds |
| 800 Oersteds — | 280 Oersteds — | 300 Oersteds |
| 890 Oersteds — | 280 Oersteds — | 300 Oersteds |

Following the magnetic image transfer, the master and copy tapes are now ready to be unwound from reel 61 onto their respective storage reels 58 and 59 as shown by FIG. 7. During this final step, it has been found desirable to play back the master audio track 71 and master cue track 72 and simultaneously rerecord these tracks, 71*a* and 72*a* respectively, on copy tape 57. Unlike the higher frequency wideband signals carried by transverse magnetic tracks 73 and 73*a* of the master and copy tapes, the low frequency audio and cue track signals incur a noticable amount of print-through during the magnetic transfer step described above. That is, the magnetic images carried by these tracks tend to influence the magnetic surface 63 of non-contacting adjacent layers of copy tape 57 while wound on reel 61. Consequently, audio and cue tracks 71*a* and 72*a* respectively are restored as shown in FIG. 7, by first erasing and then recording these tracks from playback signals derived from master tape 56 while the respective tapes are being rewound onto individual storage reels. An audio erase head 74 and cue erase head 76 as diagramatically illustrated in FIG. 7, serve to initially erase tracks 71*a* and 72*a* respectively. Audio track 71*a* is recorded onto copy tape 57 by means of record head 77, a signal processing means 78, and a reproduce head 79 disposed to read master audio track 71. Similarly, a record head 81 is disposed for rerecording cue track 72*a* in response to signal processing means 82 and a reproduce head 83 is disposed to read master cue track 72. Signal processing means 78 and 82 merely provide for amplifying the signals received from reproduce heads 83 and 79 and for issuing corresponding record signals to heads 81 and 77. The various heads 77, 81, 83 and 79 are aligned so as to time synchronize the audio and cue signal information with the wideband video signals on copy tape 57. Restoration of the audio and cue tracks in this manner can be performed at high longitudinal tape speeds, and is not limited to low speeds during required recording of the transverse video tracks.

Using the above described contact duplication process, some print-through has also been observed on the low frequency control tracks 86 and 86*a* as shown in FIG. 7. The standard control track carries a sinusoidal signal of 240 Hertz for synchronizing rotation of the head wheel and longitudinal tape drive rate. One satisfactory solution to "control track print-through" is to change the form of the standard sinusoidal control signal to a square wave signal which when recorded appears as a differentiated square wave on master tape control track 86 and likewise on copy tape control track 86*a*. The frequency composition of this differentiated square wave is less subject to print-through effects than a sinusoidal wave form of the same fundamental frequency. In order to read the differentiated square wave signal when playing the contact duplicate tape 57 back on a standard transverse scan transport, such as transport 10 shown in FIG. 1, a few minor changes are made to the playback electronics responsive to control track head 46. One suitable method is to pass the playback signal from control track head 46 through a frequency filter having a reject frequency centered at the fundamental frequency of the original square wave signal. This eliminates most if not all of the low, fundamental frequency on the control track susceptible to print-through during the above described contact duplication process. After this, the control track playback signal is fed through a high pass filter which passes frequencies above the fundamental control signal frequency. The passed, higher frequencies carry sufficient information content to enable playback synchronization of the head wheel and tape capstan drive.

While the foregoing scheme of contact duplication illustrated by FIGS. 5 through 7 has been used to obtain good quality black and white and color contact duplicate tapes from a master tape recorded on the modified transport of FIG. 3, it will be appreciated that other methods can be used for making contact duplicates of such a master tape. For example, a master tape recorded on a mechanism in accordance with the present invention may be used in a contact duplicating process of the type disclosed in U.S. Pat. No. 2,738,383. In such case, the master and copy tapes are brought into face-to-face contact while both such tapes are moving at high longitudinal translation speeds. Such an approach has been referred to as "on the fly" contact duplication and is to be compared with the "bifilar" contact duplicating scheme illustrated in the present application. By using an "on the fly" contact duplicating process, the problems of print-through encountered in the "bifilar wind" approach are not incurred. In such case, it is possible to transfer usable audio and cue track information directly from master to copy without requiring restoration thereof. Similarly, it is possible to record the standard sinusoidal control track on the master tape and to rerecord such control track signal onto the copy tape during "on the fly" duplication such that the resulting copy can be played back on a standard transport without modification to the control track playback electronics.

What is claimed is:

1. A recording system having a transverse scan tape transport for recording a master magnetic tape, wherein such master tape is to be used for making a contact duplicate tape having a mirror magnetic image of the former, said duplicate and master tapes having corresponding first and second longitudinal edges with respect to the magnetic record surfaces thereof, and said duplicate tape to be played back on a transverse scan tape transport having a head wheel means rotating in a given sense with respect to the direction of tape advancement and having a stationary magnetic head means disposed to read a prerecorded longitudinal magnetic track adjacent the first edge of said duplicate tape; said transport for recording said master tape characterized by having the same relative direction of tape advancement as the transport for playing back the duplicate tape and having a head wheel means rotating in a sense opposite said given rotational sense and having a stationary magnetic head means disposed to record a longitudinal track on said master tape adjacent the second edge thereof corresponding to said prerecorded longitudinal track adjacent the first edge on said duplicate tape.

2. In the system as defined in claim 1, said corresponding longitudinal tracks on said duplicate and master tapes being further defined as corresponding control tracks for synchronizing longitudinal tape advancement with rotation of said head wheel means.

3. In the system as defined in claim 1, said transport for playing back the duplicate tape having a curved vacuum tape guide disposed adjacent said head wheel means and being formed with a shoulder for engaging and positioning the first edge of said duplicate tape, and said transport for recording said master tape characterized by having a curved vacuum tape guide disposed adjacent said head wheel and formed with a shoulder engaging and positioning the second edge of said master tape.

4. In the system as defined in claim 1 adapted for making contact duplicates of video tape recordings wherein said corresponding longitudinal tracks are control tracks adjacent the first edge of said duplicate tape and adjacent the second edge of said master tape respectively, and said tapes being further provided with corresponding audio tracks adjacent the second edge of said duplicate tape and adjacent the first edge of said master tape, and wherein said stationary head means on the playback transport is a control track reproduce head disposed adjacent said first edge of said duplicate tape and a stationary audio reproduce head is disposed adjacent the second edge of said duplicate tape for reading said audio track during playback thereof, and said transport for recording said master tape further characterized by its stationary head means being a control track record head disposed for recording a longitudinal control track adjacent an edge of said master tape corresponding to the second edge of said duplicate tape, and having an audio record head disposed for recording a longitudinal audio track adjacent the edge of said master tape corresponding the first edge of said duplicate tape.

5. In the system as defined in claim 4, wherein said duplicate tape is to be provided with a longitudinal cue track in juxtaposition said control track and said transport for playing back said duplicate tape is equipped with a stationary cue reproduce head disposed adjacent said first edge of said duplicate tape for reading said cue track, and said transport for recording said master tape further defined by having a cue track record head disposed adjacent an edge of said master tape corresponding to the second edge of said duplicate tape for recording a longitudinal cue track along side said control track on said master tape.

6. In a transverse scan tape record/reproduce system as defined in claim 1, wherein said transport for playing back said duplicate tape and said transport for recording said master tape are each equipped with capstan drives situated in the same position and both advancing the respective tapes in the same longitudinal direction when viewed with reference to the magnetic surfaces of said tapes.

7. In a transverse scan tape record/reproduce system as defined in claim 6, said transport for recording said master tape being a modified form of said transport for playing back said duplicate tapes in that the rotational sense of said head wheel and the location of said stationary magnetic head means are changed as defined on said transport for recording said master tape.

8. A method of recording a master magnetic tape on a master transverse scan tape transport for use in making a contact duplicate tape therefrom wherein such duplicate tape is to be played back on a transverse scan tape transport having a head wheel rotating in a given sense with respect to the direction of longitudinal tape advancement and having a stationary magnetic head means disposed to reproduce a longitudinal track adjacent a given edge of such duplicate tape, comprising the steps of rotating the master transport head wheel during recording in an opposite sense from said given sense, advancing the tape on the master transport in the same longitudinal direction as on the playback transport, and recording a longitudinal track corresponding to the above mentioned longitudinal track on said master tape adjacent an edge thereof opposite the edge corresponding to said given edge on said duplicate tape.

9. A method of recording a master tape as defined in claim 8, wherein said longitudinal track is a control track for synchronizing rotation of said head wheel during playback modes.

10. The method as defined in claim 8, wherein said head wheel carries a plurality of four magnetic heads circumferentially spaced thereabout and a sequential switching means coupled to said heads is provided for combining the playback signals therefrom, further comprising the step of playing back said master tape by rotating the head wheel in the same sense by which such tape was recorded and reversing the connections of a pair of non-adjacent said heads to said switching means.

11. The method as defined in claim 8, wherein said head wheel carries a plurality of magnetic heads circumferentially spaced thereabout and a tachometer disc rotates jointly with said head wheel and is formed with a plurality of circumferentially yet non-symetrically disposed indexes providing information to a tachometer pickup indicating the rotational position of certain of said heads, further comprising the step of reversing the orientation of said tachometer disc to provide the same information to said pickup during recording of said master tape during which the rotation of the head wheel and tachometer disc is reversed.

12. A method as defined in claim 8, wherein said stationary magnetic head means on said transport for playing back said duplicate tape is a control track reproduce head disposed for reading a longitudinal control track adjacent a first edge of the tape and such transport further having a stationary information reproduce head disposed for reading a longitudinal information track adjacent a second edge of the duplicate tape, and further comprising the step of, recording a corresponding master control track along an edge of said master tape corresponding to the second edge of said duplicate tape and recording a corresponding master information track along an edge of said master tape corresponding to the first edge of said duplicate tape.

13. The method as defined in claim 12, wherein the transport for playing back said duplicate tape is equipped with an additional information reproduce head disposed for reading an additional longitudinal information track in juxtaposition with said control track, and further comprising the step of recording on said master tape a corresponding additional information track along side said master control track adjacent an edge of said master tape corresponding to the first edge of said duplicate tape.

* * * * *